United States Patent Office 2,774,786
Patented Dec. 18, 1956

2,774,786

PHOSPHONO-AMMONIUM SURFACE ACTIVE AGENTS

John G. Erickson, Minneapolis, Minn., assignor to General Mills, Inc., a corporation of Delaware No Drawing. Application August 10, 1953,
Serial No. 373,450

4 Claims. (Cl. 260—501)

The present invention relates to novel compounds having the general formula

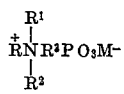

in which R is an aliphatic hydrocarbon group containing from 8–22 carbon atoms $R^1$ and $R^2$ are aliphatic groups containing from 1–4 carbon atoms, $R^3$ is a divalent aliphatic hydrocarbon group containing from 2–6 carbon atoms, and M is selected from the group consisting of sodium, potassium and ammonium. These compounds are useful as detergents, bactericides, and emulsifying agents. The products are quaternary ammonium compounds, salts of phosphonic acids and betaines.

It is, therefore, an object of the present invention to provide novel compounds having the above formula.

The reactions involved in the preparation of these compounds are illustrated as follows:

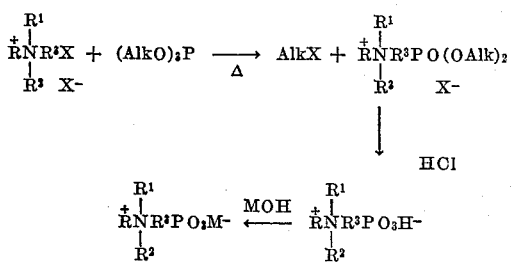

In the above formula X is a halogen selected from the group consisting of chlorine, bromine, and iodine. The trialkyl phosphite employed is preferably a lower alkyl ester where the alkyl groups contain from 1–4 carbon atoms. The reaction may be carried out at temperatures as low as 80° C. but preferably is conducted at a higher temperature, up to 200° C. since the reaction proceeds more rapidly. For example, when using triethyl phosphite, the commonest trialkyl phosphite of commerce, it is convenient to heat the mixture at reflux temperature, about 160° C. The time required depends on the temperature; less than an hour is suitable at any temperature over 140° C. Substantially equimolar amounts of reagents may be used, but it is preferred to use an excess of the trialkyl phosphite. Any such excess may subsequently be distilled off.

The hydrolysis of the dialkyl phosphonate may be carried out by heating with strong mineral acid, such as hydrochloric, hydrobromic, nitric, sulfuric or phosphoric. The phosphonic acid thus obtained may be neutralized with gaseous ammonia, ammonium hydroxide, or with alkali metal hydroxides, carbonates, bicarbonates, acetates or similar bases to form the compounds of the invention.

The quaternary ammonium starting material may be prepared from a long chain primary fatty amine by alkylation to produce a tertiary amine. This tertiary amine may then be reacted with a dihalide to produce the quaternary compound. Thus, for example, dodecylamine may be converted to dimethyldodecylamine in a conventional manner. Thereafter, the tertiary amine may be reacted with a large excess of ethylene dichloride to produce the 2-chloroethyldimethyldodecyl ammonium chloride.

The fatty amines which may be employed for the preparation of these compounds include those which contain from 8–22 carbon atoms. These are conventionally derived from fatty acids by way of the nitrile. For this purpose single isloated fatty acids as well as the mixed fatty acids of any fat or oil or any selected group of such fatty acids may be used. Accordingly, the amines obtained may be either saturated or unsaturated or may be mixed saturated and unsaturated amines.

Preferably the groups $R^1$ and $R^2$ are methyl groups in view of the ease of obtaining compounds of this type. However, these groups may be varied to contain from 1–4 carbon atoms without significant effect upon the ultimate compound. They may be hydrocarbon groups such as methyl, ethyl, propyl and butyl or may contain functional groups which will not interfere with the reaction such as hydroxyethyl.

Example 1

A mixture of 26 parts of 2-chloroethyldimethyldodecyl ammonium chloride and 100 parts of triethyl phosphite was refluxed for 3 hours. Unreacted triethyl phosphite was then distilled off under reduced pressure. The residue was heated at 95° C. for 9 hours with 60 parts of concentrated hydrochloric acid. The hydrochloric acid was then distilled off and the residue was dissolved in water and neutralized with sodium bicarbonate. This gave an aqueous solution of the desired product, the sodium salt of the betaine of the 2-phosphonoethyldimethyl-dodecyl-ammonium compound. The dry solid product was isolated by diluting the aqueous mixture with acetone, separating the lower layer, stripping it of volatiles, then dissolving the residue in ethyl alcohol, filtering and evaporating the alcohol solution. The product is quite soluble in water, forming solutions which foam readily. It is an effective emulsifying agent.

Example 2

A mixture of 4.85 parts of 2-bromoethyldimethyloctadecylammonium bromide and 33.2 parts of triethyl phosphite was refluxed for 3 hours. The reaction began vigorously at 125° C. and the reflux temperature rose rapidly to 156° C. The unreacted triethyl phosphite was distilled off under reduced pressure. The residue was heated with a mixture of 12 parts of concentrated hydrochloric acid and 5 parts of water for 2.5 hours on the steam bath. Volatile materials were then distilled off. The residue was mixed with 20 parts of water and stirred vigorously, then neutralized with sodium bicarbonate. The dry product was obtained by freezing the solution and subliming the water under reduced pressure. The residue was dissolved in methanol, filtered and evaporated to dryness. This left a waxy solid, the sodium salt of the 2-phosphonoethyldimethyl-octadecylammonium compound. It dissolved in water, giving solutions which foamed readily. It was observed to be effective as an emulsifying agent. It was tested as a detergent on cloth soiled with carbon black; it was found to remove 103% as much carbon black as did the well known and widely used detergent, sodium dodecyclbenzenesulfonate.

I claim as my invention:

1. Compounds having the formula

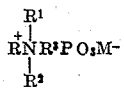

in which R is an aliphatic hydrocarbon group containing from 8–22 carbon atoms, $R^1$ and $R^2$ are aliphatic groups containing from 1–4 carbon atoms, $R^3$ is a divalent aliphatic hydrocarbon group containing from 2–6 carbon atoms, and M is selected from the group consisting of sodium, potassium and ammonium.

2. Compounds having the following formula:

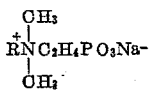

in which R is an aliphatic hydrocarbon group containing from 8–22 carbon atoms.

3. 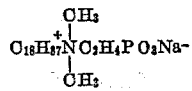

4. 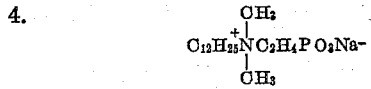

References Cited in the file of this patent

Kosolapoff: Organo-Phosphorus Compounds, Wiley (1950), pp. 155–156.

Medred et al.: C. A. 46, 7997 (1952).